Patented July 19, 1927.

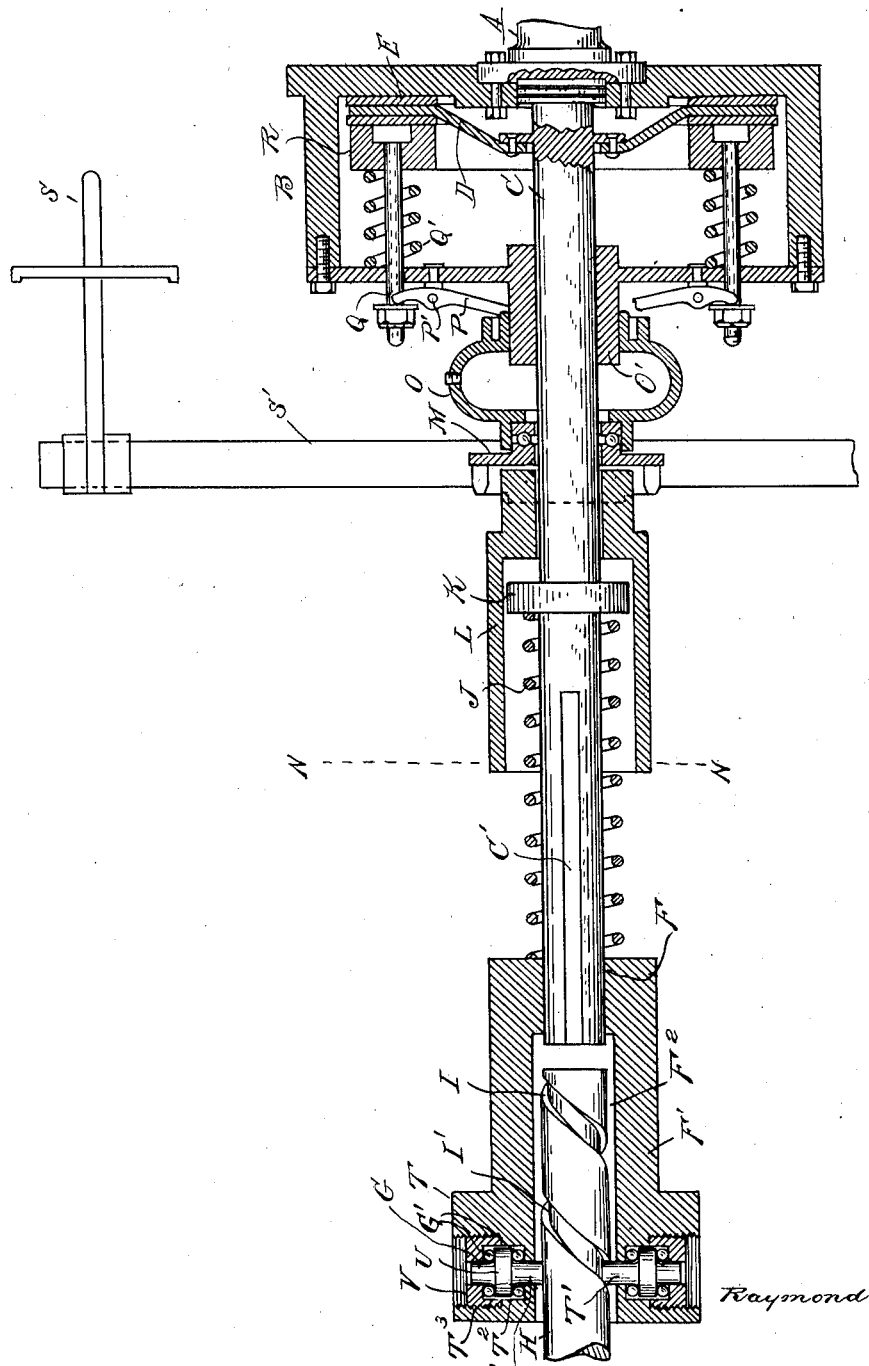

1,636,009

UNITED STATES PATENT OFFICE.

RAYMOND S. MILLER, OF DETROIT, MICHIGAN.

TORQUE TRANSMISSION MECHANISM.

Application filed August 16, 1924. Serial No. 732,537.

The invention relates to a torque transmission mechanism such as is adaptable for insertion between the driving and driven shafts of an automobile and is particularly adapted to be placed between the clutch and the selective gear transmission.

One of the objects of the invention is to provide a device for resiliently absorbing the shocks due to the sudden application of torque when the clutch is thrown in. Another object of the invention is to provide for the release or slipping of the clutch when full torque is applied, thereby more gradually transmitting the driving force to the driven shaft and the mechanism connected thereto. These and other objects are accomplished by the novel construction hereinafter more fully set forth which comprises essentially a coupling sleeve having a splined engagement with one shaft and a spiral groove and pin engagement with the other shaft. With this arrangement the application of torque to one of the shafts imparts a longitudinal thrust to the sleeve tending to move the same longitudinally upon the spline shaft. For resisting this longitudinal movement there is a spring capable of offering a yielding resistance to the travel of the sleeve, this spring being of sufficient tension so as to prevent the full longitudinal movement of the sleeve except when the maximum torque is applied to the mechanism. Under the latter condition, however, the sleeve is adapted to contact with a member for releasing the clutch, thereby uncoupling the drive and driven shafts when the shock of starting exceeds the normal full driving torque.

In the drawings:—

The figure is a longitudinal section through the improved transmission mechanism;

A is a driving shaft connected to the engine or other source of power. B is a clutch connected to the driving shaft and adapted to drive the clutch shaft C by means of the friction disks D and E. The clutch shaft C is provided with longitudinal grooves C' adapted to engage the splines F in the sleeve or coupling member F'. The latter is also provided with a counterbore F² into which project the radial pins G which are rotatably mounted on one end of the sleeve, preferably by means of the balls G'. H is the driven shaft preferably the main shaft of the selective gear transmission mechanism and is provided at one end with the spiral grooves I and I' engaging the inner ends of the pins G. As shown, the shaft H is provided with a pair of spiral grooves forming in effect, a double thread and the sleeve F' is correspondingly provided with a pair of rotatable pins G. The spiral spring J is sleeved upon the clutch shaft C between the sleeve F' and a collar K, the latter being secured to the shaft C.

With the arrangement as above described, when torque is applied to the drive shaft A it is transmitted through the clutch shaft C, the sleeve F' and the pins G to the driven shaft H and because of the spiral arrangement of the grooves I and I' a longitudinal thrust is imparted to the sleeve F' resisted only by the tension of the spring J. Thus, when a sudden torque is applied to the driving shaft, the sleeve F' will move longitudinally against the tension of the spring J until the tension of said spring is sufficient to neutralize the longitudinal thrust. This will minimize the shock loads received by the driven shaft H, while the transmission of torque will be constant when the sleeve has reached a position of equilibrium.

One of the features of my invention is that the device is adapted to release the clutch whenever the torque due to the suddenly applied load rises above the normal maximum driving torque and this is accomplished by providing an arrangement which will throw out the clutch whenever the sleeve F' moves a greater distance than that corresponding to the normal full load torque. As particularly shown in the drawing, this arrangement comprises a collar L slidably mounted upon the clutch shaft C, this collar being arranged adjacent to the clutch collar M and adapted to actuate the same whenever the end of the sleeve F' is moved to the position represented by the dotted line N—N corresponding to the maximum torque.

The clutch collar may be arranged to release the clutch in any well known manner but as shown, it is arranged to bear against the grease-retaining annular member O which is slidably mounted upon the hub O' and adapted to actuate the levers P, the latter being fulcrumed at P' and arranged to withdraw the pins Q against the tension of the clutch springs Q'. These pins are attached to the ring R which has one of the friction disks E secured thereto and the withdrawal of this ring therefore, frees the member D from frictional engagement therewith and thus, disengages the clutch.

It will be understood of course, that the clutch may also be released manually by actuating the foot pedal S which is secured in the usual manner to the shaft S′ having a rocker arm (not shown) also secured thereto for engaging the clutch collar M. Thus, when the clutch is thrown in by the operation of the pedal S, if the driving shaft A is revolving at a high speed the shock incident to the coupling of the shaft A to the driven shaft H will be taken up by the longitudinal movement of the sleeve F′ and when the latter strikes against the collar L the clutch will automatically be released, or at least will be allowed to slip slightly and a gradual engagement of the clutch will result, thereby eliminating undue shock upon the driven mechanism. On the other hand, since the spring is of a sufficient tension to transmit the normal full driving torque the device will in no way impair the maximum transmission of power for which it is designed.

For inserting the pins G in the sleeve F′ any suitable arrangement may be used, but as specifically shown, the sleeve is provided with an enlarged head T having the diametrically opposite radial bores T′, the counterbores T² and the enlarged threaded openings T³. The pins G are provided with the enlarged central portions U adapted to retain the balls G′ in the counterbores T² and there is also provided the threaded plugs V insertable in the threaded apertures T³ to retain the pins in position.

The pitch of the spiral grooves I and I′ must also be designed so that the contact of the pins with the sides of the grooves is not within the angle of friction in order that the torque will impart a longitudinal thrust to the sleeve F′. Preferably the angle is 45° so that the resistance to the longitudinal movement of the sleeve in opposite directions is exactly the same. In certain cases it may be found advantageous to depart slightly from this angle in order to lessen the friction when the torque is being applied in the normal direction of rotation.

What I claim as my invention is:—

1. A torque transmission mechanism comprising driving and driven shafts, one being provided with a longitudinal groove and the other with a spiral groove, a sleeve surrounding said shafts having a spline engaging said longitudinal groove, and a radially extending pin engaging said spiral groove, a collar on said driving shaft, a spring sleeved on said shaft intermediate said collar and said sleeve, a clutch having driving and driven elements, the latter elements being connected to said driving shaft, and a release lever for said clutch actuated by a predetermined longitudinal movement of said sleeve against the tension of said spring.

2. A torque transmission mechanism comprising a driving shaft, a sleeve longitudinally slidable thereon, and secured thereto to prevent relative rotation, a driven shaft having one end thereof provided with spiral grooves, radially extending pins rotatably mounted in said sleeve, a spring sleeved upon said driving shaft and bearing against said sleeve, a collar on said driving shaft forming an abutment for the end of said spring opposite to the end bearing against said sleeve, a clutch having driving and driven elements, the latter elements being secured to said driving shaft, a releasing lever for said clutch, and a collar longitudianlly slidable on said driving shaft, said collar being in the path of movement of said sleeve and adapted to actuate said releasing lever.

3. A torque transmission mechanism comprising driving and driven members, one being provided with a longitudinal groove and the other with a spiral groove, a sleeve surrounding one of said members having a spline engaging said longitudinal groove, and a radially extending pin engaging said spiral groove, an abutment in fixed longitudinal relation to said driving member, a spring sleeved on one of said members intermediate said abutment and said sleeve, a clutch having driving and driven elements, said driven elements of the clutch being connected to said driving member and means for disengaging the driving and driven elements of said clutch actuated by a pre-determined longitudinal movement of said sleeve against the tension of said spring.

In testimony whereof I affix my signature.

RAYMOND S. MILLER.